(12) United States Patent
Lee et al.

(10) Patent No.: US 8,998,722 B2
(45) Date of Patent: Apr. 7, 2015

(54) DOMAIN-BASED GAME INTERFACES AND SERVERS

(75) Inventors: Brian Elan Lee, Venice, CA (US);
Michael Sean Stewart, Davis, CA (US);
James Stewartson, Manhattan Beach, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 13/413,862

(22) Filed: Mar. 7, 2012

(65) Prior Publication Data

US 2012/0231889 A1   Sep. 13, 2012

Related U.S. Application Data

(60) Provisional application No. 61/450,064, filed on Mar. 7, 2011.

(51) Int. Cl.
*A63F 9/24* (2006.01)
*A63F 13/30* (2014.01)

(52) U.S. Cl.
CPC ........... *A63F 13/12* (2013.01); *A63F 2300/204* (2013.01); *A63F 2300/205* (2013.01); *A63F 2300/308* (2013.01); *A63F 2300/407* (2013.01); *A63F 2300/5506* (2013.01); *A63F 2300/5553* (2013.01); *A63F 2300/807* (2013.01)

(58) Field of Classification Search
USPC ......................................................... 463/42
See application file for complete search history.

(56) References Cited

U.S. PATENT DOCUMENTS

| 8,108,459 | B1 * | 1/2012 | Hoffman et al. | 709/203 |
| 8,239,487 | B1 * | 8/2012 | Hoffman et al. | 709/218 |
| 2001/0024974 | A1 * | 9/2001 | Cohen | 463/42 |
| 2006/0105838 | A1 | 5/2006 | Mullen | |
| 2006/0202427 | A1 * | 9/2006 | McDougal | 273/430 |
| 2007/0226062 | A1 * | 9/2007 | Hughes et al. | 705/14 |
| 2007/0281766 | A1 | 12/2007 | Mullen | |

(Continued)

FOREIGN PATENT DOCUMENTS

| EP | 1235410 | 8/2002 |
| GB | 2417694 | 3/2006 |

(Continued)

OTHER PUBLICATIONS

Fourth Wall Studios, Inc., International Application PCT/US12/028001, filed Mar. 7, 2012, International Search Report dated Jul. 30, 2012, 3 pgs.

(Continued)

*Primary Examiner* — Tramar Harper
(74) *Attorney, Agent, or Firm* — Stetina Brunda Garred & Brucker

(57) ABSTRACT

A gaming platform is presented where various types of non-game domains can be incorporated into a game as a game component. Two or more domains, possibly a website, can become a territory within an online game where players cooperate or compete to dominate the website. The domains can be bridged or otherwise linked to form a game map topology, and allow movement of a player's units from one domain to another. The game space can be presented to players as an overlay in a browser allowing players to engage the game and browse domain content without necessarily affecting the underlying website.

13 Claims, 6 Drawing Sheets

(56) References Cited

U.S. PATENT DOCUMENTS

| | | | |
|---|---|---|---|
| 2008/0015018 A1 | 1/2008 | Mullen | |
| 2008/0015024 A1 | 1/2008 | Mullen | |
| 2009/0017913 A1* | 1/2009 | Bell et al. | 463/40 |
| 2009/0036216 A1* | 2/2009 | Ratcliff | 463/42 |
| 2009/0181774 A1 | 7/2009 | Ratcliff | |
| 2010/0041457 A1 | 2/2010 | Cook et al. | |
| 2010/0144434 A1 | 6/2010 | Leingang et al. | |
| 2010/0210357 A1 | 8/2010 | Slough et al. | |
| 2011/0242134 A1 | 10/2011 | Miller et al. | |

FOREIGN PATENT DOCUMENTS

| | | |
|---|---|---|
| WO | 01/39016 | 5/2001 |
| WO | 2007/010336 | 1/2007 |

OTHER PUBLICATIONS

Benford, S., et al., "Visualising and Populating the Web: Collaborative Virtual Environments for Browsing, Searching and Inhabiting Webspace," Computer Networks and ISDN Systems, North Holland Publishing, Amsterdam, NL, vol. 29, No. 15, Nov. 1, 1997, pp. 1751-1761.

* cited by examiner

DOMAIN-BASED GAME INTERFACES AND SERVERS

This application claims the benefit of priority to U.S. provisional application having Ser. No. 61/450,064 filed on Mar. 7, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is gaming technologies.

BACKGROUND

Board games and video games have a long history of providing entertainment to players by presenting a platform through which players attempt to conquer territory. Even in the real-world, gaming enthusiasts play games to conquer territory, not the least of which are Football or paintball. The thirst for new battle grounds seems to be insatiable.

What has yet to be appreciated is there is an inexhaustible supply of potential new battle grounds to be explored or conquered based on on-line or virtual domains. For example, each web site or page can represent a territory to be conquered or acquired. One can construct a gaming system where players cooperate or compete to conquer a web site or gain resources made available via the web site. Furthermore, one can provide a game agent that allows individuals to interact with the game system while also browsing or viewing the target website.

Interestingly, not much effort has been directed to providing infrastructure for allowing users to interact with a game while also browsing domains. For example, U.S. pat. publ. no. 2010/0041457 to Cook et al. (publ. February 2010) describes an interface through which players can communicate with other players. The interface can include a game overlay presenting a chat window while also presenting full screen game play. Although useful to present multiple layers of information, Cook fails to appreciate that non-game domains could be a component of a game.

In a similar vein, U.S. pat. publ. no. 2010/00210357 to Slough et al. (publ. August 2010) also describes providing overlays in a gaming environment, which can include a web browser. Even Slough fails to appreciate that domain content or other viewed domain can become an integral part of a game.

U.S. pat. publ. no. 2009/0036216 to Ratcliff (publ. February 2009) and U.S. pat. publ. no. 2009/0181774 to Ratcliff (publ. July 2009) discuss a gaming environment where players can compete over internet websites. However, Ratcliff fails to appreciate that various websites can be linked together to create a game map topology, and further fails to contemplate the interposing of non-internet domains into game play.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for providing gaming system infrastructure to allow bridged domains to become part of the game.

SUMMARY OF THE INVENTION

The inventive subject matter provides apparatus, systems and methods in which one can create or participate in a game where actual on-line domains become territories within the game. One aspect of the inventive subject matter includes a gaming interface through which a player can interact with a gaming environment. The gaming interface can include a computing device (e.g., a computer, a game console, a cell phone, etc.) having a browser application configured to obtain domain content from a domain, a network address for example. In more preferred embodiments, the domain content can include a generic web-page obtained from a URL. The interface can also include a game agent coupled with the browser application and adapted to communicate with a game server. One should appreciate that domain content can be treated as separate from or as part of game content exchanged with the game server. The game agent exchanges game content with the game server, and presents game content overlaid on the presented domain content. In more preferred embodiments, the domain from which the domain content is obtained represents a component of the game (e.g., territory to be captured, resources, battle grounds, units, etc.). One should further appreciate that the domains providing the domain content can operate under control of a distinct entity or owner from those controlling or managing the game server.

Yet another aspect of the inventive subject matter includes a game server platform configured to host one or more game instances playable by a solo player or even multiple players. The game server platform can include a game agent interface that communicatively couples with a game agent, possibly operating as a game client or peer. The game agent can include an app, an application, a browser plug-in, a screen saver, active desktop or wallpaper, or other type of gaming module operating on a device (e.g., cell phone, computer, vehicle, appliance, etc.). Preferably the game agent is capable of browsing a domain, such as a web page for example. In addition, the game server platform can also include a game management engine that governs game mechanics and game components of one or more instances of the game. The game server manages the game instances based on game content exchanged between the game management engine and the game agent. In more preferred embodiments, the game content can include information relating to at least one domain where the domain represents a game component in the game instance. One should appreciate that a single domain could be a game component in different, distinct game instances.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
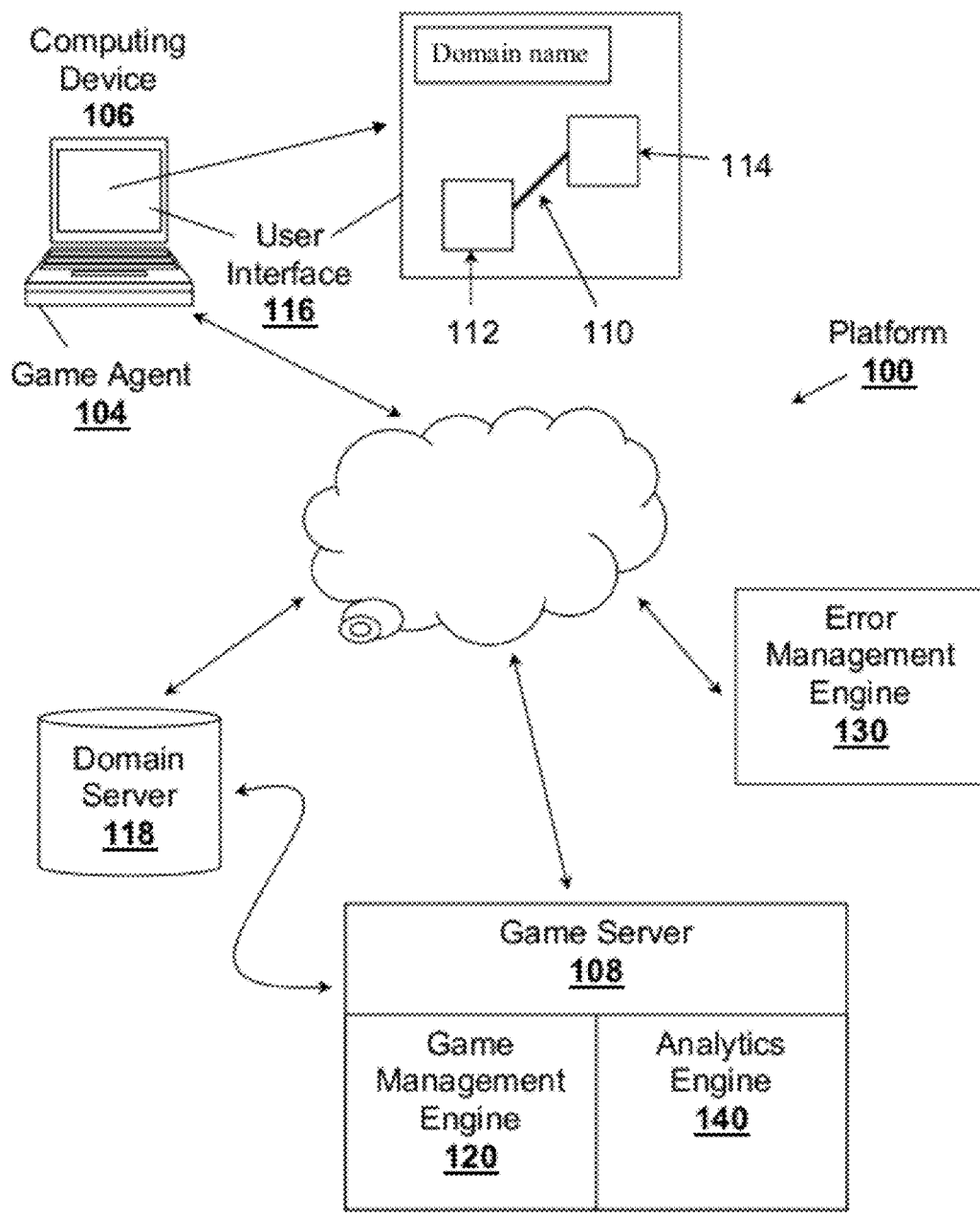
FIG. 1 is a schematic of an embodiment of a game server platform.

It should be noted that while the following description is drawn to a computer/server based gaming platforms, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, PAN, or other type of packet switched network.

One should appreciate that the disclosed techniques provide many advantageous technical effects including configuring gaming devices to treat domains (e.g., web pages, virtual locations, real-world locations, etc.) as components of a game. The gaming devices exchange game content related to the domains with other gaming devices or gaming servers.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter is considered to include incorporating a domain, representing a non-game related entity, into an instance of a game. As used herein, domains can include real-world domains, virtual domains, or other types of domains. Preferred domains include virtual domains represented by top level domains, web pages, links, articles, posts, source files, or other linkable objects on-line. Domains can be accessed by one or more network addresses (e.g., GUID, URL, URI, DOI, GPS coordinates, IP addresses, etc.) via a computing device through a browser application or other interface. Although one preferred embodiment focuses on on-line domains, one should appreciate that other domains can also be utilized as a game component including outdoor locations, buildings, rooms, fixtures, vehicles, persons, companies, or other real-world domains. One should appreciate a domain exists independent of the game and can remain unaffected by the game unless authorized by the domain owner. Thus, vast armies can battle over a web site, such as www.google.com, as conquerable territory without affecting the web site, unless Google® authorizes such interactions.

Furthermore, domains could include virtual locations apart from Internet websites, whether or not fictional. Alternatively or additionally, domains could be sponsored by one or more entities, such as a Disneyland™ domain or a Pandora™ domain (i.e., from the movie Avatar™).

In FIG. 1, one embodiment of a game server platform 100 is shown. Contemplated platforms include a game agent interface 116 configured to couple with at least one game agent 104. The game agent 104 preferably resides at least in part on a computing device 106. Contemplated computing devices include, for example, desktops, laptops, netbooks, tablet PCs, and other personal computers, mobile and smart phones, game consoles, personal digital assistants, MP3 players, watches, televisions, appliances, radios, vehicles, kiosks, and any other device having some form of network connectivity to allow for exchange of game related data.

Preferably the computing device 106 is outfitted with a domain browser capable of acquiring data associated with a target domain. The game agent 104 can be integrated within a browser application or other application to present game content along with domain content. The game agent 104 could alternatively take on many different forms. For example, in a browser environment, the game agent 104 can include a browser plug-in. Alternatively, the game agent 104 can include applications, apps, screen savers, active desktops, or other type of applications. The game agent 104 advantageously allows a player to browse at least one domain by acquiring data relating to the domain. As referenced previously, the domain can include virtual domains (e.g., on-line web sites, top level domains, fictional locations, etc.) or real-world domains.

Although a single player might use a single computing device 106 to play a game, it is contemplated that multiple computing devices can be associated with each player. Multiple devices can be integrated into the gaming experience where each device can comprise its own gaming agent. For example, a player might play the game within a browser on his or her computer while an electronic picture frame on his or her desk could show status reports for the game. Furthermore, many players each utilizing one or more computing devices could engage the game instance through their own game agents.

The game agent 104 preferably has access to domain content, which can be exchanged with a game server 108. Domain content could be stored on one or more domain servers 118. The domain content could be stored locally to the game server 108 or stored remotely on a non-affiliated server associated with the specific website. Domain content could include, for example, sensor data, graphics, audio, FLASH, or other types of data associated with a target domain. In addition, the game agent 104 can also obtain game content from the game server 108 and present the game content along with the domain content to a user. In more preferred embodiments, visual game content can be visually overlaid on the domain content. In such embodiments, it is also contemplated that the game content can be integrated with the domain content to create a richer experience, while the domain itself remains unaffected for other non-users.

Game content can range across a wide spectrum of data types capable of enhancing game play on the computing device 106. Game content can include visual data, audio data, haptic data, command data (e.g., device commands), or other types of data. As the game agent 104 exchanges data with the game server 108, the game agent 104 can update its presentation to the user on the computing device 106.

The game server 108 can provide the infrastructure necessary to host a game instance for one or more players. The game instance can be considered one instantiation of a game for a group of players. For example, a first set of players could battle for a web site in a first game instance while a second different set of players could battle for the same web site in a completely distinct instance of the game while both sets of players are unaware of each other's activities. Thus, the game server 108 could host multiple instances of the same game. Alternatively, it is contemplated that there could be multiple game servers that each could host one or more instances of a game.

It is further contemplated the game agent 104 can take an active role in interacting with the domain content rather than a passive role. For example, the game agent 104 could be configured to allow domain content to affect game content or to allow game content to affect domain content. Such embodiments provide a platform through which owners of domains can participate more fully in a player's experiences, possibly in exchange for a fee. For example, Barnes and Noble® might provide additional gaming resources on its website only available through the game agent 104, or when a team or player conquers the Barnes and Noble website they receive a message or promotion (e.g., coupon, discount, award, etc.).

The game interface 116 can present the game content. As discussed previously, the user interface 116 can comprise an overlay displayed on, or otherwise presented over, the domain content. The game or user interface 116 can provide support for one or more functions including, for example, a visualizer of the game content, an error message interface, a chat interface, a minimizer that can hide the game content, a maximizer that restores game content, or other game related controls such as mute, help, and so forth.

Figure 2:
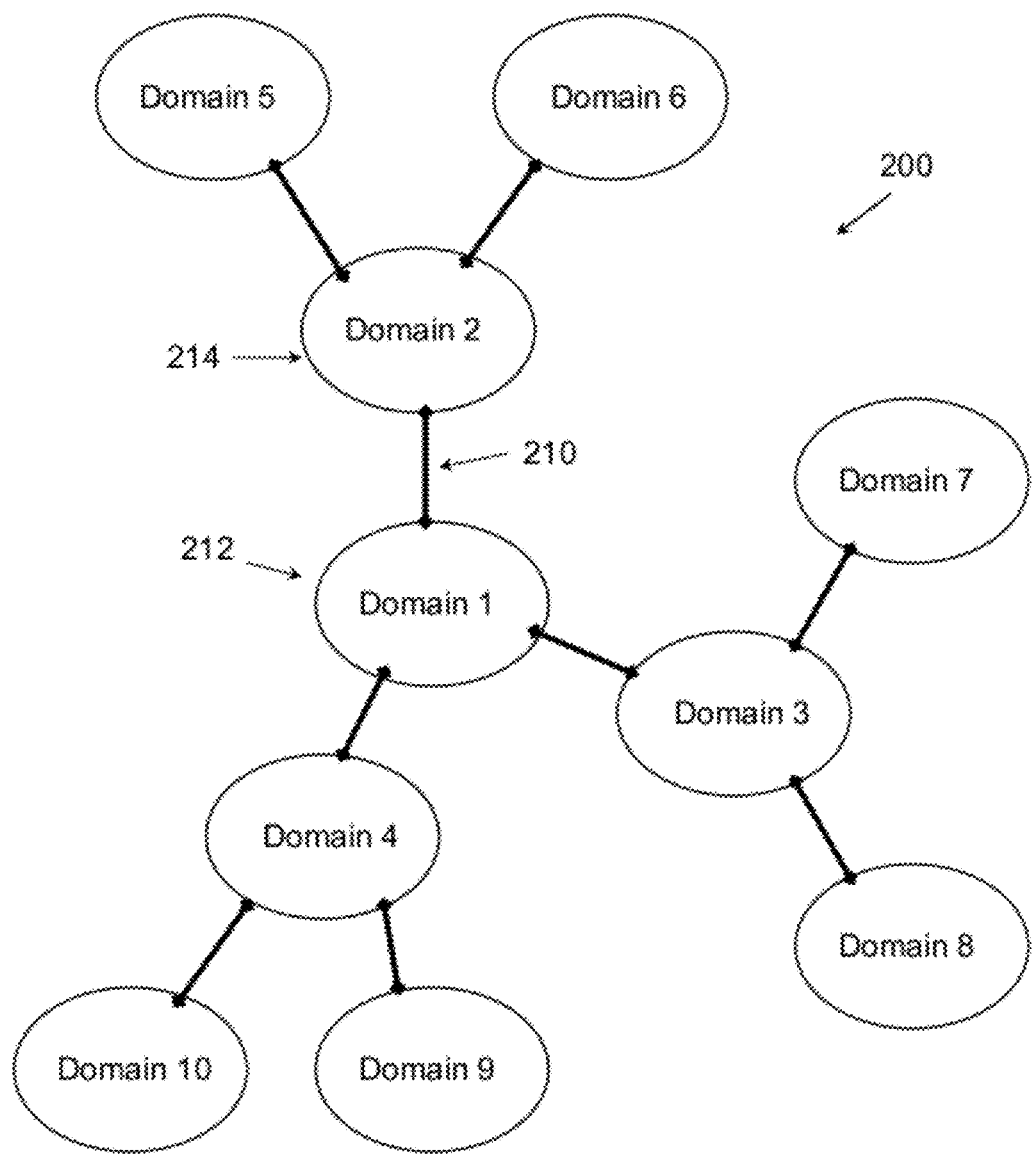
FIGS. 2-3 are schematics of various embodiments of a game map topology.
Figure 3:
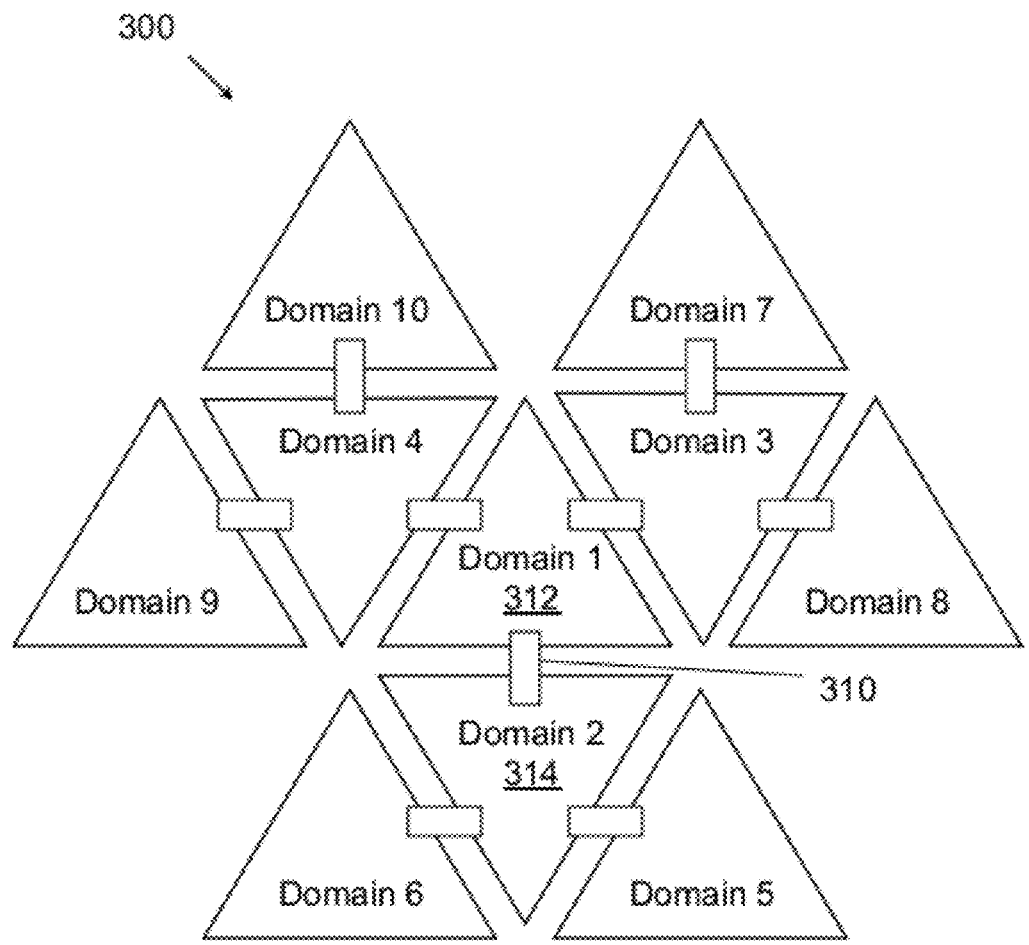

In some contemplated embodiments, the visualizer can be used to combine at least some of the domain content with game content to create a topographical map such as those shown in FIGS. 2-3 or a three-dimensional terrain, for example, based on the domain content. For example, domain content could be visualized in three-dimensions by using algorithms that draw on basic properties of the a website, such as color, size, traffic, etc., to create a topography for that website, which could be exploited for game play. Of course, as the underlying domain content will change over time, so too can the domain, which can introduce an additional variable to game play.

It is especially preferred that the game agent 104 is configured to present at least one bridge 110 linking first and second distinct domains 112 and 114, where the game agent 104 is further configured to allow a user to browse at least the first and second bridged domains 112 and 114. Each of the first and second bridged domains 112 and 114 can comprise a virtual domain including, for example, a top level domain (e.g., www.google.com), a webpage (e.g., www.fourthwall-studios.com/platform), a news or other article, a link, a television or other video streaming service, and a source file. However, it is also contemplated that one or both of the first and second bridged domains 112 & 114 can comprise a real-world domain, such as a player's house, a room, a business, an outdoor location, a landmark, a person, a vehicle, a fixture, or other object or location.

It is contemplated that in an instance of the game, the game agent 104 could present multiple bridges that each link a pair of domains. By linking various pairs of domains, players can begin to create a game map topology of their territories based on the now linked domains. In this manner, players can create their own territory that can be mapped where the various domains of each player/team can represent captured states. A more detailed discussion of the bridges can be found below in reference to FIG. 2.

Each game instance can also include many different types of game components. As mentioned previously, domains can represent a type of game component, possibly including a territory. Furthermore, domains can function as a resource where credits, units, or raw resources (e.g., energy, metal, ore, wood, sheep, etc.) can be earned by dominating the domain or territory. Additional exemplary game resources can include, for example, currency, promotions, units, specific resources, rewards, achievements, badges, award points, or other types of game resources. Thus, it is contemplated that a player or team could earn units or other resources from a territory while that player or team is in control of that territory. The resources earned could vary from territory to territory, and could vary depending upon a level of the player, a total amount of territories controlled by the player or team, the number of territories controlled by a player or team of a certain group (e.g., search engine websites, etc.), and so forth. It is also contemplated that players could purchase additional units or resources for use in the game.

Yet another type of game component can include units (i.e., totems) or armies associated with players or teams where the units can migrate from one domain to another within the game space by player instructions. Preferably, the units can only travel from one domain to another domain that is linked to that domain by a bridge. The units can thereby travel over a bridge linking the two domains. However, it is also contemplated that units could travel through portals, airships, boats, or other transportation options within the game space. Game commands issued to the game components can originate from player commands, player environment data (e.g., location, acceleration, orientation, biometrics, etc.), team commands, computer (AI) commands, or other commands.

When a player or team take over a domain or other territory, the player's or team's name and graphics, if any, can be overlaid on that domain or territory and displayed for all other player's and/or teams in that game instance.

The platform 100 can further include a game management engine 120 configured to manage or otherwise govern game mechanics and game components (e.g., the first and second bridged domains 112 and 114, units, etc.) one or more game instances based on game content exchanged with the player computing devices. In some contemplated embodiments, the game management engine 120 can construct one or more game instances based on information obtained from players, advertisers, or even from domain owners.

One especially interesting aspect of the inventive subject matter includes tracking player interactions within the game space and the domain space, especially in view that the domain space can comprises on-line websites or even commercial real-world locations. To that end, an analytics engine 140 can be incorporated within the game server 108 to track player demographics as the players interact with the domains. Alternatively, analytics engine 140 could reside separately from the game server 108, whether locally or remote. The analytics engine 140 can advantageously provide for collecting valuable data, which can be presented to advertisers or other entities in exchange for a fee. For example, a website participating as a domain within the game might observe a particular segment of the gaming population fails to spend time on the website because the site is too easily conquered. The domain owner can pay additional fees to make their site more difficult to conquer (e.g., change the domain's terrain), thus requiring players to remain longer on the website. Therefore, domain owners can directly or indirectly influence aspects of the game mechanics or game play of one or more game instances. Such data could also be used by domain owners to vary the domain content to attract different segments of the gaming population.

In further contemplated embodiments, such data could be used by advertisers to direct more specific advertising to the demographics of the players or team that has currently conquered a specific domain. In some embodiments, advertisements on a website could be dynamically altered or overlaid on the website based on the player(s) or team that has currently conquered the website. Thus, for example, if team A has conquered website A, and team A is composed of males that are 16-18 years old, advertisements on website A could be dynamically placed that are targeted to that demographic, and could change if website A is conquered by a different demographic. In such embodiments, it is contemplated that a non-player visiting the domain could see a different set of advertisements than players of the game or a specific game instance.

In view of the volatile nature of the Internet, the game space, or other aspects of the gaming environment, errors will likely occur during game play. More preferred game platforms 100 could also include an error management engine 130 communicatively coupled with the game agent 104 of each player. Should a game instance have game content satisfying notification criteria, the error management engine 130 can be configured to send notifications to the game agent 104 for presentation to the player. One should note the notification criteria can depend on both game content within the game space and domain content within the domain space. Simple errors could include, for example, where a player is attempting to bridge a domain that already has a maximum number of bridges.

Many types of games are contemplated for use with the inventive subject matter. One preferred type of game includes a real-time strategy game where units can be deployed and interact with each in near real-time under management of the game management engine 120. It is also contemplated that the game management engine 120 could deploy a turn-based strategy game allowing players to submit orders which can then be issued to all units across the game space. Furthermore, a game instance could also include a hybrid real-time/turn-based game if desired. All manner or types of games are contemplated.

In one contemplated embodiment, each player could begin a game with a set number of units, which they can place on a single unclaimed domain or territory (e.g., a first domain), for example. That domain or territory would then be owned by that player and the player's team, if any. To conquer additional territory, the player could link the initial territory to another territory (e.g., a second domain) by a bridge. Once linked, the player could then move some of its units from the first domain to the second domain. It is contemplated that a player could be limited to owning or controlling a finite number of territories, the number of which could be increased through achievements or purchased upgrades, for example.

An attack can occur if one player or team moves units to a territory owned by another team or player that is not affiliated with the first player. The outcome of an attack can be based upon a random number generator where each player's or team's strength is based on the number of units he or she has, as well as any weapons, fortifications, injuries, unit experience, and so forth. In some contemplated embodiments, a random number within a predefined range is generated for each unit, and the unit with the highest number is the victor for that attack with a tie going to the defender. When a unit is defeated, the defeated unit can be removed from the game, captured, or other disposition.

It is contemplated that if multiple units are attacking and defending, each unit can generate a random number, and the two highest numbers on each side are compared. Two units are then disposed of depending on which unit generated the highest number or tied. The attack can continue until the attacker retreats, the attacker's units are all defeated, or the defender's units are all defeated. If the attacker prevails, the territory-at-issue will change ownership to the attacker.

Websites are preferably grouped by domain to simply the game space. Thus, for example, www.espn.com would include all sub-domains and websites of that domain. However, it is also contemplated that some domains could be broken up on a webpage by webpage basis. For example, www.facebook.com could be divided into member's pages. Similarly, popular blogging domains could be divided by blog rather than grouped as a single domain.

FIG. 2 illustrates a game map topology 200 comprising the first and bridged domains 212 and 214 linked by bridge 210. The game map topology 200 further includes a plurality of other domains (i.e., domains 3-10) that are linked together by bridges to form a map of a player's territories or domains. The game map topology of FIG. 2 assumes that each domain can have a maximum of three bridges. Thus, in such example, the topology 200 can be seen as having a core or primary domain (domain 1), to which secondary domains (domains 2-4) are linked. Tertiary domains (domains 5-10) can be linked to the secondary domains. In this manner, players or a team can insulate their core domain(s) they wish to control.

One should note the bridges merely represent links between domains within the game space and do not necessarily have to correspond to hyperlinks in the domain content. For example, google.com could be linked with yahoo.com where no a priori domain space link exists. Thus, game instances can have nearly a limitless set of territory configurations, which can be dynamically altered as players link and unlink domains.

The bridges could add additional variables to the game play. For example, there could be different types of bridges that each has unique characteristics that could affect unit movement and so forth. For example, one type of bridge (e.g., a wider bridge) might allow more units to pass per unit of time than another type of bridge (e.g., a narrower bridge). The type of bridge could impact the speed at which units can move over the bridge. In addition, bridges might also deteriorate or disappear after a certain amount of time depending upon a quality associated with the bridge. It is also contemplated that at least some of the bridges could be sponsored or require payment to utilize (e.g., a toll bridge). Sponsored bridges could have more favorable characteristics, for example. It is further contemplated that some bridges could have branches, such as a Y-shape bridge and so froth, which would allow two domains to connect to another domain using a single bridge.

It is also contemplated that conquered territories could be mapped against one or more physical objects, images, or locations. For example, territories of a player or team or opposing players/teams might be mapped against a real-world map. In other contemplated embodiments, each territory could be associated with a real-world location. For example, a player's primary territory could be mapped to the player's house or other location (the "starting location") with the secondary, tertiary, and other territories begin mapped to locations that are increasingly farther away from the starting location. In such embodiments, it is contemplated that a player could physically walk to move between his or her virtual territories. It is further contemplated that a player might attack another player's territory by physically moving to the other player's territory. The attack could then be carried out through the game agent 104 as described herein, or in the real world such as through a laser-tag type game, a network-connected board game, and so forth.

In other contemplated embodiments, a player might initiate attack on another player's physical location by calling or texting the defending player. The game agent could forward a location of the defending player's mobile phone, as identified by the phone's GPS coordinates sent from the phone to a game server or game management engine. The defending player's location could then be attacked and conquered by the attacking player if the attacking player is victorious. In such embodiments, it is contemplated that the defending player could utilize a camera of a mobile phone or other portable computing device, and visually see the attacker's units advancing on the defending player's location such as by the game agent overlaying images or video on the camera's real-time image. A more detailed discussion of augmented reality games can be found in U.S. provisional application having Ser. No. 61/450,052 filed on Mar. 7, 2011, which is incorporated herein by reference in its entirety.

FIG. 3 illustrates an alternate game map topology 300, which also assumes that each domain can have a maximum of three bridges. Of course, the maximum number of bridges per domain can be varied or eliminated without departing from the scope of the inventive subject matter discussed herein. With respect to the remaining numerals in FIG. 3, the same considerations for like components with like numerals of FIG. 2 apply.

Figure 4A:
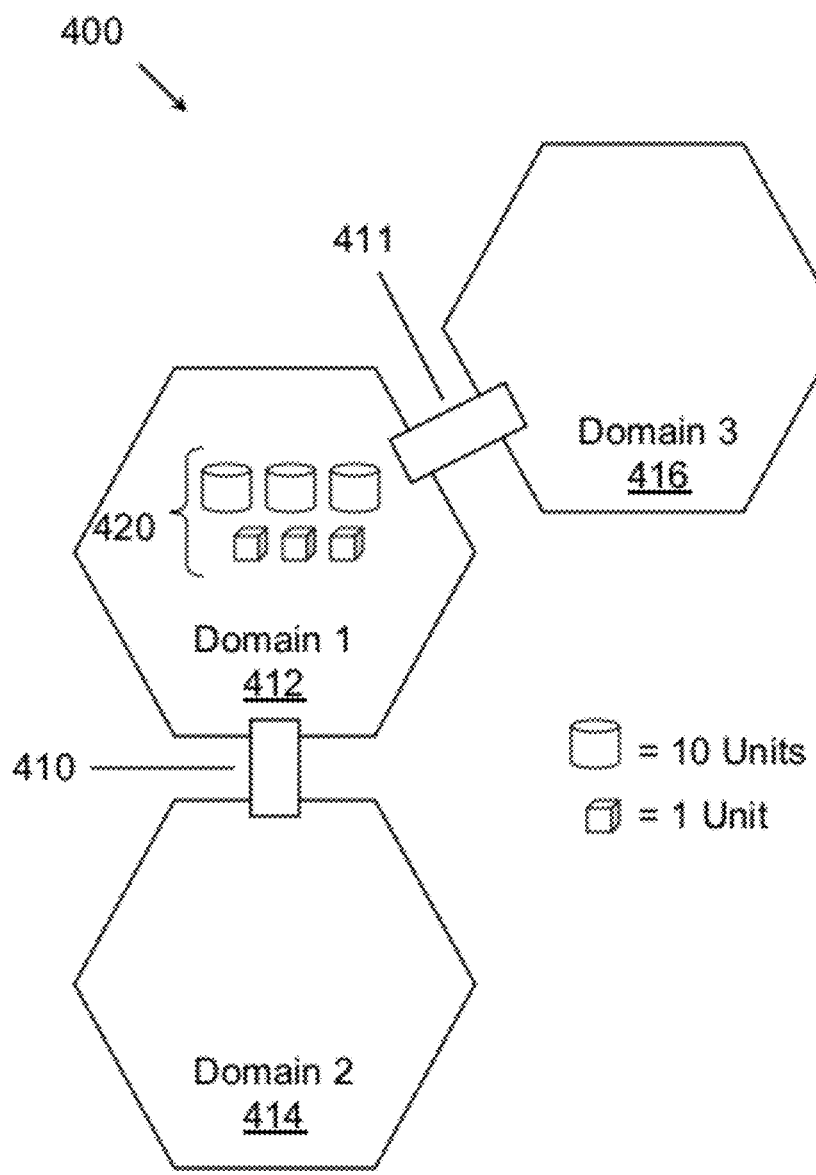
FIGS. 4A-4B are schematics of another embodiment of a game map topology showing movement of units between bridged domains.
Figure 4B:
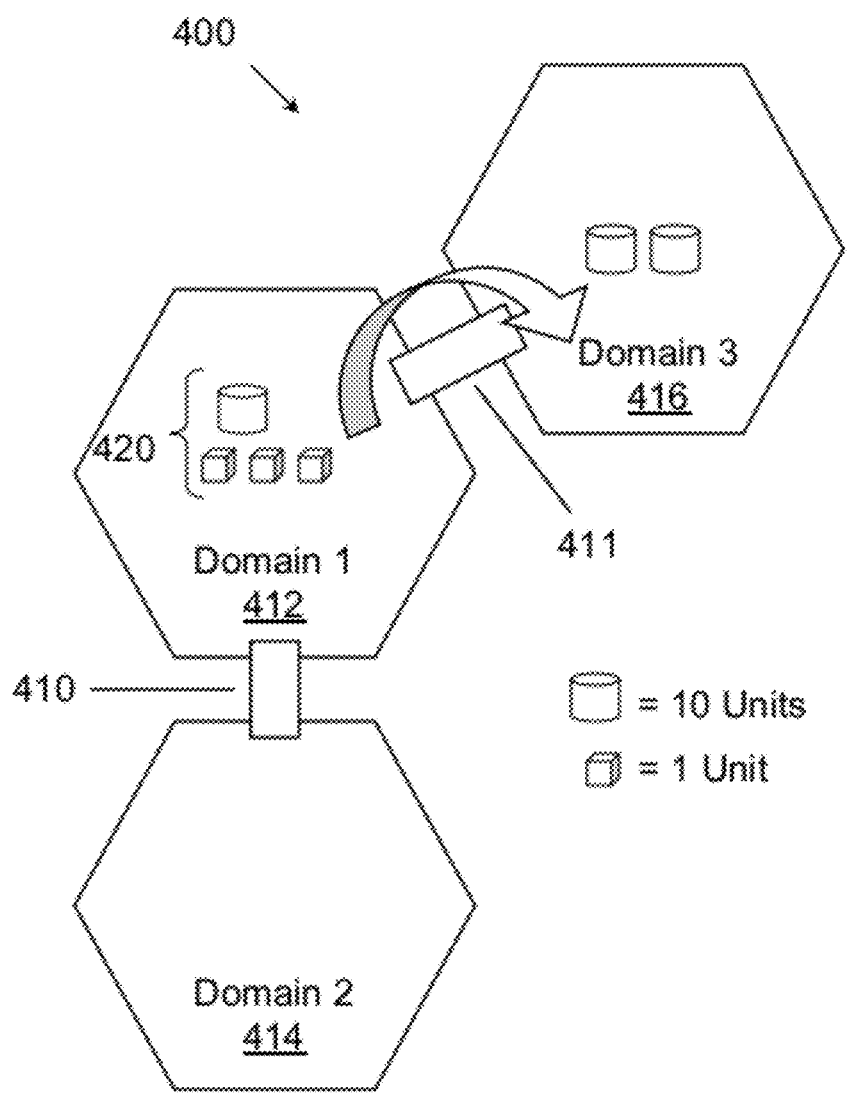

In FIGS. 4A-4B, a game map topology 400 is shown for a player having first, second, and third domains 412, 414, and 416, respectively. The first and second domains 412 and 414 are linked via bridge 410, and the first and third domains 412 and 416 are linked via bridge 411.

In FIG. 4A, units 420 are positioned on the first domain 412. Although the units are represented as icons, it is contemplated that the units could be represented by a graph or chart, colors, or other symbols. At least some of the units 420 can be moved to a bridged domain as shown in FIG. 4B. Here, the player has decided to move 20 units from the first domain 412 to the third domain 416, as shown by the arrow, leaving the first domain with 13 units and the third domain with 20 units.

Figure 5:
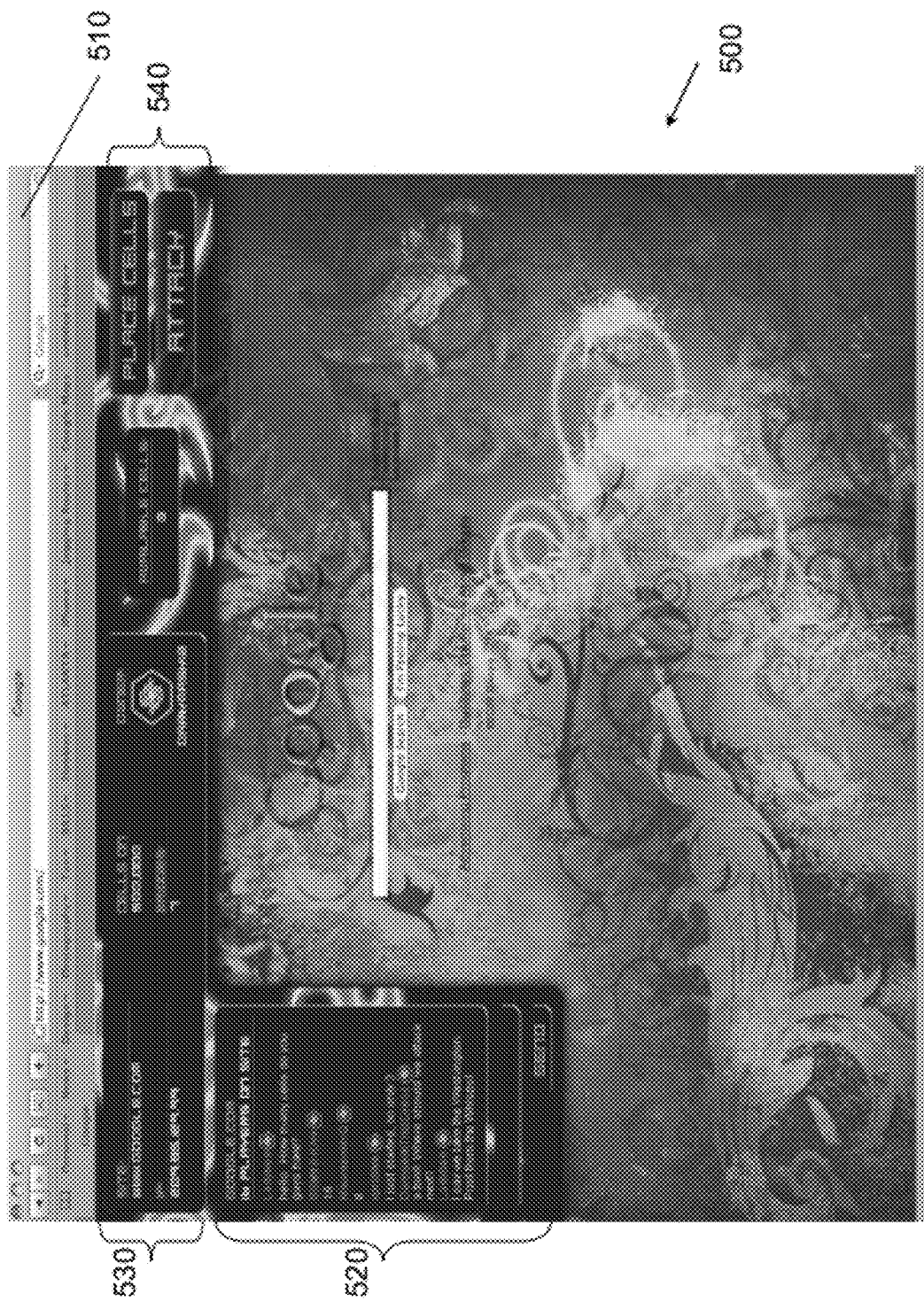
FIG. 5 is an embodiment of a user interface.

FIG. 5 illustrates one embodiment of a user (game) interface 500, which can be incorporated into a web browser 510, such as via a browser plug-in. However, it is alternatively contemplated that the user interface 500 can be included in a separate application having its own web browsing capabilities. The user interface 500 can include a chat window 520 where players can chat with other players, and an information window 530 displaying the domain's current owner, the domain name, the number of units (cells) on the domain, the number of bridges connected to the domain, or other pertinent information. The user interface 500 can also include one or more command control icons 540 including, for example, place units, place a bridge, remove a bridge, move units, attack a domain, defend a domain, purchase units, and so forth.

In some contemplated embodiments, the interface 500 can prohibit the user from interacting with the underlying domain while the game agent is activated. However, in other contemplated embodiments, players can interact with the domain while playing the game. Thus, in the embodiment shown in FIG. 5, it is contemplated that a player could conduct a search using the domain interface provided by Google®, for example. Where the player is permitted to interact with the domain, it is contemplated that the player's interaction could dynamically change the game play. For example, a player may modify a Wikipedia™ page that the player has conquered, which could vary a three-dimensional landscape of the page.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A game server platform comprising:
a game agent that includes a computing device having a processor configured to execute stored software instructions, wherein the game agent is configured to associate a first set of domains with a first user and a second set of domains with a second user, wherein the domains of the first set are associated with one another via a first collection of bridges, and wherein the second set of domains are associated with one another via a second collection of bridges;
wherein the game agent is further configured to provide a game to allow the first user to browse the first set of domains linked by the first collection of bridges via a first game interface, and allow the second user to browse the second set of domains linked by the second collection of bridges via a second game interface;
wherein the first game agent interface is configured to present to the first user a dynamic game map topology that includes the first set of domains and the first collection of bridges linking the domains; and
wherein the first set of domains comprises a primary domain, a set of secondary domains, and a set of tertiary domains, and wherein the primary domain is linked to each of the second domains via bridges of the first collection, and wherein each of the secondary domains is associated with at least one of the tertiary domains via at least one of the first collection of bridges.

2. The game server platform of claim 1, wherein the game interface is further configured to allow the first user to browse only the associated domains of the first set.

3. The game server platform of claim 1, wherein the first and second set of domains overlap.

4. The game server platform of claim 1, wherein the first and second set of domains are non-overlapping.

5. The game server platform of claim 1, wherein at least one of the domains of the first set comprises a virtual domain.

6. The game server platform of claim 5, wherein the virtual domain comprises at least one of the following: a top level domain, a web page, an article, a link, and a source file.

7. The game server platform of claim 1, at least one of the domains of the first set comprises a real-world domain.

8. The game server platform of claim 7, wherein the real-world domain comprises at least one of the following: an outdoor location, a building, a room, a fixture, a person, and a vehicle.

9. The game server platform of claim 1, further comprising an analytics engine configured to track user demographics as the first and second users interact with the game agent.

10. The game server platform of claim 1, wherein the first game agent interface is further configured to execute a browser application that presents the dynamic game map topology to the first user and presents game content overlaid with domain content to the first user as the first user browses domains of the first set.

11. The game server platform of claim 10, wherein the game agent is further configured to allow domain content to affect the game content.

12. The game server platform of claim 10, wherein the game content exchanged with the game server comprises at least a portion of the domain content.

13. The game server platform of claim 10, wherein the browser application is further configured to allow the first user to modify the first set of domains to add or remove a domain from the first set by associating the domain or disassociating the domain with one of the domains of the first set, respectfully, and wherein the game agent is further configured to update the game map topology to represent the modification to the first set of domains.

* * * * *